March 2, 1965   C. J. GRISWOLD, JR   3,171,644
DETENT MEANS FOR A MOVABLE OPERATING MEMBER
Filed Sept. 6, 1962
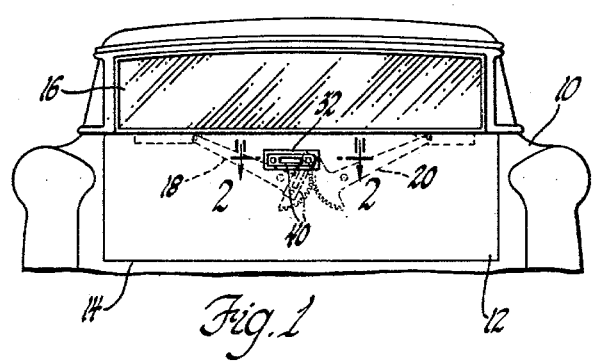
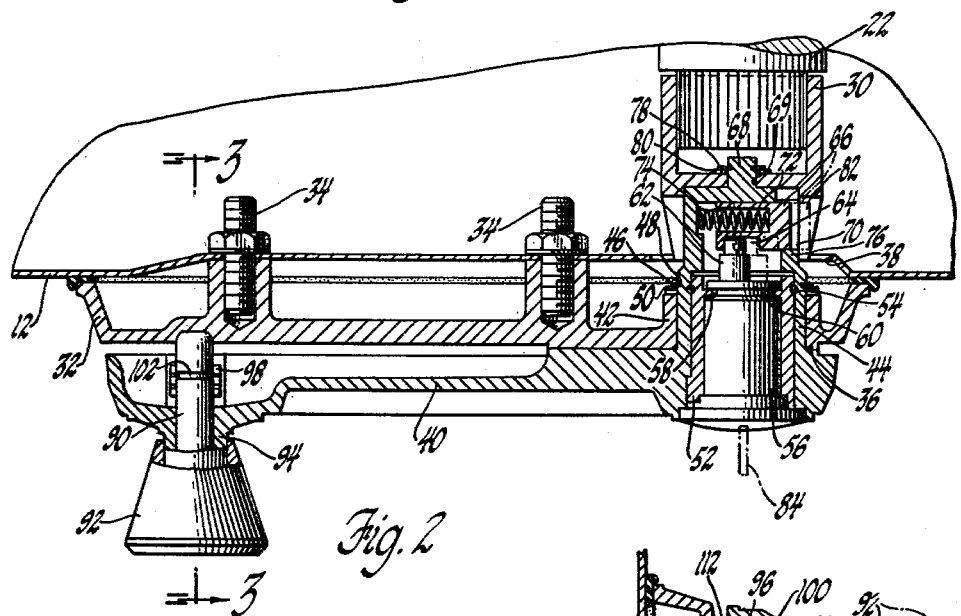
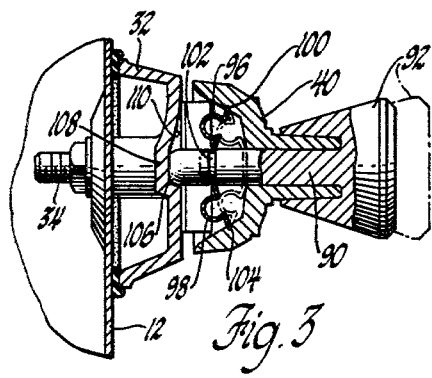
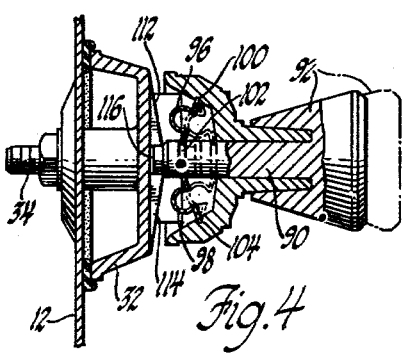
INVENTOR.
Charles J. Griswold, Jr.
BY
Paul J. Ethington
ATTORNEY

United States Patent Office 3,171,644
Patented Mar. 2, 1965

3,171,644
DETENT MEANS FOR A MOVABLE
OPERATING MEMBER
Charles Jerome Griswold, Jr., Bloomfield Township, Mich., assignor to General Motors Corporation, Detroit, Mich., a corporation of Delaware
Filed Sept. 6, 1962, Ser. No. 221,845
6 Claims. (Cl. 268—126)

This invention relates to detent means and, more particularly, to a novel detent means for locking a movably mounted operating member to a supporting member in a desired position.

Applications may arise wherein it is desirable that an operating member which is movably mounted to a support member be locked in a desired position with respect to the support member. One such application is an operating member in the form of a crank handle rotatably mounted on the exterior of a station wagon tailgate and connected with a vehicle window regulator mechanism for operating the mechanism. From a styling viewpoint it may be desirable that after the tailgate window is cranked to its desired position, that the crank handle be locked in some desired position, such as vertical or horizontal, with respect to the tailgate. Another desirable reason for locking the crank handle in position with respect to the tailgate is to prevent the handle from swinging freely about its axis of rotation when not in an operative condition, which under certain road conditions may result in objectionable noises if the handle rattles against its support member.

In accordance with this invention, a novel detent means is provided for locking an operating member in a desired position with respect to a support member to which it is movably mounted. The detent means includes a detent control member slidably mounted to the operating member for movement to first and second positions. The control member and the support member are each provided with locking means adapted to maintain the control member locked to the operating member when the control member is in the first position. Resilient means are provided for biasing and maintaining the operating member in its first position. Accordingly, when the control member is in its first position and received by the locking means on the support member the operating member is locked to the support member. Furthermore, when the control member is urged toward the second position with sufficient force to overcome the resilience of the resilient means the operating member is unlocked, permitting movement thereof. The invention is particularly adapted for use in conjunction with a station wagon tailgate window regulating mechanism and an operating member for operating the mechanism wherein it is desirable that the operating member be locked in a particular position with respect to the tailgate when the operating member is in a nonoperative condition.

A more complete understanding of this invention may be had from the detailed description which follows taken with the accompanying drawing in which:

FIGURE 1 is a partial rear elevation view of a station wagon body embodying detent means according to this invention;

FIGURE 2 is an enlarged partially broken away plan view of the detent means and is taken along lines 2—2 in FIGURE 1 looking in the direction of the arrows;

FIGURE 3 is an enlarged sectional view taken along lines 3—3 in FIGURE 2 looking in the direction of the arrows; and FIGURE 4 is an enlarged sectional view of another embodiment of the invention.

Referring now to the drawings and more particularly to FIGURE 1, there is shown a station wagon body 10 including a tailgate 12 which is swingably mounted on the body at its lower edge 14 for movement between a closed position, as shown, and an open position wherein the tailgate is disposed in a generally horizontal position. The tailgate 12 supports a window 16 which is movable between a closed position, as shown, and an open position within the tailgate, not shown. The window 16 is moved between open and closed positions by a window regulator mechanism which includes a pair of lift arms 18 and 20 and means, not shown, connecting the lift arms with a window regulator drive spindle comprising a rotatable shaft 22 splined at one end to a clutch member 30 (see FIGURE 2).

As shown in FIGURES 1 and 2 of the drawing, a rectangular shaped escutcheon 32 is mounted to the exterior of the tailgate 12 by suitable means 34. The escutcheon 32 is provided with a circular aperture 36 coaxial with a circular aperture 38 of larger diameter in the tailgate 12. The escutcheon 32 includes a hollow cylindrically shaped hub 42 which surrounds the aperture 36. A window regulator crank handle 40 seats against the outer end of hub 42 and includes a hollow cylindrical shaped hub 44 rotatably received within hub 42 and fixed against axial outward movement therefrom by means of a split ring 46 which is received within a groove 48 of hub 44 and bears against a washer 50 located between the split ring and the inner end of hub 42. A lock cylinder housing 52 is received within the hub 44 of handle 40 and is held in place therein with an annular retaining ring 54 interposed between the hub 44 and the housing 52. A lock cylinder 56 is received within housing 52 and is fixed against axial outward movement from the housing 52 by means of an annular flange 58 extending radially inward from the housing 52 and received by an annular groove 60 in the lock cylinder 56.

The lock cylinder 56 includes a lug 62 which is eccentrically located with respect to the axis of rotation thereof and is received within a slot 64 of a locking pawl 66. The pawl 66 is slidably mounted on one end of an axial lug 68 which protrudes through an aperture 69 in the base of the clutch member 30. The pawl 66 is continually urged radially outward through a slot 70 in the hub 44 by means of a coil compression spring 72 which is received within a bore 74 of the pawl 66 and seats on a lug 76 protruding from the hub 44.

The clutch member 30 is mounted on the inner end of hub 44 and is rotatably secured thereto by means of a split ring 78 which is received within a groove provided in the axial lug 68. A washer member 80 is provided between the split ring 78 and the base of the clutch member 30. The clutch member 30 is also provided with an axial slot 82 which is adapted to receive the lock pawl 66.

If the operator now inserts a suitable key 84 into the lock cylinder 56 and turns it clockwise approximately 90°, looking upwards in FIGURE 2, the lug 62 will be displaced to the position shown by the dotted lines. Thus, the pawl 66 will be displaced radially outward by means of the compression spring 72 to a clutched position indicated by the dotted lines shown in FIGURE 2 so as to be received by the slot 82 in the clutch member 30. With the pawl 66 received in the slot 82, the clutch member 30 provides driving engagement between the handle 40 and the window regulating mechanism via the rotatable shaft 22. If the operator now turns the key 84 so as to return the lug 62 and the pawl 66 to the positions shown by the solid lines in FIGURE 2, then the clutch member 30 will be locked in its declutched position so as to thereby maintain the handle 40 and the window regulating mechanism in disconnected relationship.

In accordance with this invention, detent means are provided for locking the handle 40 to the escutcheon 32 in a horizontal position as shown by the solid lines in FIGURE 1. The detent means comprises a cylindrically shaped plunger member 90 having a knob 92 on one end. The plunger member 90 is movably mounted to the handle 40 at a circular aperture 94 therein for movement to an extended detented position and a retracted unlocked position as shown my the solid and dashed lines, respectively, in FIGURE 3. A pair of overcenter springs 96 and 98 are interposed between the plunger member 90 and the handle 40. The spring 96 has one end pivotally received in a groove 100 in the handle 40 and has its other end pivotally received in an annular groove 102 in the plunger member 90. Similarly, the spring 98 has one end pivotally received in a groove 104 in the handle 40 and the other end pivotally received in the annular groove 102 in the plunger member 90. During assembly, the overcenter springs 96 and 98 are compressed into place so that the springs exert forces on the plunger member 90 whereby as the plunger member is moved through a neutral position toward either its extended detented position or its retracted unlocked position the plunger member is biased and maintained in that position. Furthermore, it is preferable that the tension of the springs 96 and 98 be sufficient that the plunger member 90 is prevented from being displaced from the handle 30 without first removing the springs.

The escutcheon 32 has formed therein a recess 106 terminating in a rigid surface 108. The recess 106 is provided with a plunger member cam surface or ramp surface 110 inclined with respect to the surface of the escutcheon 32. The recess 106 is sufficiently deep that when the plunger member 90 cams against the ramp surface 110 the plunger member will retract against the tension of springs 96 and 98 and pass through a neutral position whereby the springs will bias and maintain the plunger member in its retracted unlocked position.

If the operator desires to lock the handle 40 to the escutcheon 32 he merely grasps the knob 92 and rotates the handle 40 about the axis of lock cylinder 56 until the plunger member 90 is aligned with the recess 106. The knob is then depressed toward the handle 40 so that the plunger member 90 is moved to its extended detented position and received by the recess 106 in the escutcheon 32. The walls of the recess 106 coact with the springs 96 and 98 to lock the handle 40 in place on the escutcheon 32. To unlock the handle 40 the operator merely grasps the knob 92 and retracts the plunger 90 from the recess 106 to its retracted unlocked position where it is maintained by the springs 96 and 98. Alternatively, to unlock the handle 40, the operator merely grasps the knob 92 and rotatably moves the handle 40 about the axis of lock cylinder 56 so as to cam the plunger member 90 against the ramp surface 110 of the recess 106 so that the plunger member 90 retracts against the tension of springs 96 and 98 and passes through a neutral position whereby the springs 96 and 98 act to bias and maintain the plunger member in its retracted unlocked position.

In FIGURE 4, there is shown a second embodiment of the detent means which differs from that shown in FIGURE 3 in that a pair of spaced plunger member guide ramps 112 and 114 are provided on the surface of the escutcheon 32 and protrude outwardly therefrom. The ramps 112 and 114 define a notched portion or recess 116 in the spacing therebetween adapted to receive the plunger member 90 when it is in its extended detented position. The ramps 112 and 114 are positioned on the escutcheon 32 so that the plunger member 90 must cam against one of the ramps, depending on the direction of approach of the handle 40, before being received by the recess 116. The ramps 112 and 114 are constructed each having a height whereby when the plunger member 90 is in its extended detented position and is cammed against either of the ramps 112 or 114, the plunger member will not retract through a neutral position and be biased to its retracted unlocked position by the springs 96 and 98.

While this invention has been described with respect to two embodiments it is not to be construed in a limiting sense. Numerous variations and modifications within the spirit and scope of the invention will now occur to those skilled in the art. For a definition of the invention, reference is made to the appended claims.

I claim:
1. In combination with an operating member movably mounted by a support member, detent means for locking the operating member in a desired position with respect to the support member and comprising a detent member slidably mounted by the operating member for movement to an extended detented position and to a retracted detent releasing position, the support member defining a detent recess adapted to receive the detent member in its extended detented position, and resilient means interposed between the detent and operating members and alternately operable to bias and maintain the detent member in either its retracted or extended positions whereby the detent member when extended and received in the detent recess locks the operating member against movement relative to the support member and alternately unlocks the operating member for movement when retracted from the recess against the detent extending biasing action of the resilient means thereby causing the alternate biasing action of the resilient means to maintain the detent member in its retracted unlocked position.

2. In combination with an operating member rotatably mounted by a support member and operably connected to a vehicle window regulating mechanism, detent means for locking the operating member in a desired position with respect to the support member and comprising a detent member slidably mounted by the operating member for movement between an extended detenting position and a retracted detent releasing position, the support member having a detent recess adapted to receive the detent member and forming an abutment surface engageable with the detent member when actuated to its extended position within the recess, resilient means interposed between the detent member and the operating member and alternately operable to bias and maintain the detent member in either its extended or retracted positions whereby the detent member when extended and received within the detent recess locks the operating member against the abutment surface of the support member and when retracted from the detent recess against the detent extending biasing action of the resilient means unlocks the operating member for window regulating rotation relative to the support member with the alternate biasing action of the resilient means maintaining the plunger member in its retracted unlocked position, and a portion of the detent recess in the support member defining a ramp surface permitting rotation of the operating member away from the abutment surface of the support member thereby camming the plunger member to its retracted unlocked position maintainable by the alternate biasing action of the resilient means.

3. In combination with a vehicle window regulating mechanism and an operating member rotatably mounted by a support member and drivingly connectable to said mechanism, means for detenting the operating member in a desired non-operating position with respect to the support member and comprising a detent plunger slidably mounted by the operating member for movement between an extended detenting position and a retracted position releasing said detenting means, the support member having a detent recess adapted to receive the detent plunger and forming an abutment surface engageable with the detent plunger when actuated to its extended position, resilient means interposed between the detent plunger and the operating member and alternately operable to bias and maintain the detent plunger in either its extended or retracted positions whereby the detent plunger when extended and received within the detent recess engages the abutment surface of the support member to restrain the operating member against rotation in one direction from its desired non-operating position and when retracted from the detent recess against the detent extending biasing action of the resilient means releases the operating member for rotation relative to the support member and causes the alternate biasing action of the resilient means to maintain the detent plunger in its retracted position, a portion of the recess in the support member defining an inclined ramp surface opposite the abutment surface permitting rotation of the operating member opposite said one direction away from its detented non-operating position and camming the detent plunger outwardly during such rotation to its retracted position subsequently maintainable by the resilient means thereby releasing the operating member for window regulating rotation in either direction, clutch means interposed between the window regulating mechanism and the operating member and alternately shiftable between clutched and declutched positions to connect the operating member to rotatably drive the mechanism and to disconnect the operating member for rotation independently of the mechanism, and means selectively operable to lock and maintain the clutch means in its declutched position disconnecting the operating member from the window regulating mechanism.

4. In combination with an operating member rotatably mounted by a support member and drivingly connected to a vehicle window regulating mechanism, means for detenting the operating member in a desired non-operating position with respect to the support member and comprising and detent member slidably mounted by the operating member for movement between an extended detented position and to a retracted detent releasing position, a pair of oppositely inclined ramps formed on the support member and defining a detent recess therebetween adapted to receive the detent member when actuated to its extended detented position, and resilient means interposed between the detent member and the operating member and alternately operable to bias and maintain the detent member oppositively to either its extended or retracted positions whereby the detent member when extended and received within the recess between the support member guide ramps detents the operating member in its non-operating position relative to the support member and when retracted from the recess against the detent member extending biasing action of the resilient means releases the operating member for window regulating rotation, and said inclined ramps and the alternate biasing action of the resilient means cooperating to cam and bias the detent member to its retracted position upon rotation of the detent member relative to either of said ramps thereby releases the operating member for subsequent window regulating rotation.

5. In combination with a vehicle window regulating mechanism and an operating member rotatably mounted by a support member and drivingly connectable to said mechanism, detent means for maintaining the operating member in a desired non-operating position with respect to the support member and comprising a detent member slidably mounted by the operating member for movement between an extended detented position and a retracted detent releasing position, said support member having a pair of spaced oppositely inclined ramps and having a recess formed between said ramps and adapted to receive the detent member when actuated to its extended position, resilient means interposed between the detent member and the operating member and alternately operable to bias and maintain the detent member in either its extended or retracted positions whereby the detent member when extended into the support member recess detents the operating member in its non-operating position relative to the support member and when retracted from the recess against the detent engaging biasing action of the resilient means releases the operating member for window regulating rotation, the alternate biasing action of the resilient means biasing and maintaining the detent member in its retracted position, said inclined ramps being engageable to cam the extended detent member to its retracted position upon rotation of the operating member relative thereto, clutch means interposed between the window regulating mechanism and the operating member and operative to alternately connect the operating member to rotatably drive the mechanism and to disconnect the operating member for rotation independently of the mechanism, and means selectively operable to lock and maintain the clutch means in its operative position disconnecting the operating member from the window regulating mechanism.

6. In combination with an operating member rotatably mounted by a support member and operably connected to a vehicle window regulating mechanism, detent means for maintaining the operating member in a desired non-operating position with respect to the support member and comprising a detent member slidably mounted by the operating member for movement between an extended detenting position and a retracted position disengaging the detent means, the support member having a detent recess adapted to receive and tending to restrain the detent member to maintain the desired position of the operating member when the detent member is actuated to its extended detenting position, resilient means interposed between the detent member and the operating member and alternately operable to bias and maintain the detent member in either its extended or retracted positions whereby the detent member when extended and received within the detent recess detents the operating member in its desired non-operating position against rotation relative to the support member and when retracted from the detent recess agains the detent extending biasing action of the resilient means releases the operating member for window regulating rotation relative to the support member with the alternate biasing action of the resilient means subsequently tending to maintain the detent member in its retracted detent releasing position, and the detent recess in the support member defining an inclined cam surface permitting rotation of the operating member in one direction away from its detented position thereby causing said inclined surface to cam the detent member to its retracted position subsequently maintained by the alternate biasing action of the resilient means.

References Cited in the file of this patent

UNITED STATES PATENTS

| | | |
|---|---|---|
| 677,890 | Smith et al. | July 9, 1901 |
| 2,900,183 | Leslie et al. | Aug. 18, 1959 |

UNITED STATES PATENT OFFICE
CERTIFICATE OF CORRECTION

Patent No. 3,171,644                                    March 2, 1965

Charles Jerome Griswold, Jr.

It is hereby certified that error appears in the above numbered patent requiring correction and that the said Letters Patent should read as corrected below.

Column 3, line 8, for "my" read -- by --; column 5, line 43, for "oppositively" read -- oppositely --; column 6, line 47, for "agains" read -- against --.

Signed and sealed this 21st day of September 1965.

(SEAL)
Attest:

ERNEST W. SWIDER                                EDWARD J. BRENNER
Attesting Officer                                      Commissioner of Patents